US011153873B2

(12) United States Patent
Yang et al.

(10) Patent No.: US 11,153,873 B2
(45) Date of Patent: Oct. 19, 2021

(54) RESOLVING TIME-DOMAIN RESOURCE ALLOCATION AMBIGUITY

(71) Applicant: QUALCOMM Incorporated, San Diego, CA (US)

(72) Inventors: Wei Yang, San Diego, CA (US); Huilin Xu, San Diego, CA (US); Peter Pui Lok Ang, San Diego, CA (US); Heechoon Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/581,168

(22) Filed: Sep. 24, 2019

(65) Prior Publication Data

US 2020/0107321 A1 Apr. 2, 2020

Related U.S. Application Data

(60) Provisional application No. 62/738,864, filed on Sep. 28, 2018, provisional application No. 62/741,893, (Continued)

(51) Int. Cl.
*H04W 4/00* (2018.01)
*H04W 72/04* (2009.01)
(Continued)

(52) U.S. Cl.
CPC ....... *H04W 72/0446* (2013.01); *H04W 72/02* (2013.01); *H04W 72/042* (2013.01); *H04W 88/02* (2013.01)

(58) Field of Classification Search
CPC ............ H04W 72/0446; H04W 72/02; H04W 72/042; H04W 88/02; H04L 5/0092; H04L 5/0053
(Continued)

(56) References Cited

U.S. PATENT DOCUMENTS

| 9,907,064 B2* | 2/2018 | Saito | H04W 72/042 |
| 2014/0185540 A1* | 7/2014 | Gaal | H04L 5/0053 |
| | | | 370/329 |

(Continued)

FOREIGN PATENT DOCUMENTS

EP 2582074 A2 4/2013

OTHER PUBLICATIONS

ETRI: "DCI Format Ambiguity in the Overlapping Region of Common and UE-Specific Search Spaces in Cross-Carrier Scheduling," 3GPP Draft; R1-103880 Search Space Overlap, 3rd Generation Partnership Project (3GPP), Mobile Competence Centre, 650, Route Des Lucioles, F-06921, Sophia-Antipolis Cedex, France, vol. RAN WG1, No, Dresden, Germany, Jun. 28, 2010, Jun. 22, 2010 (Jun. 22, 2010), pp. 1-3, XP050449278, [retrieved on Jun. 22, 2010], p. 1. line 8-p. 3, line 13.

(Continued)

*Primary Examiner* — Chuong T Ho
(74) *Attorney, Agent, or Firm* — QUALCOMM Incorporated (57) ABSTRACT

Various aspects of the present disclosure generally relate to wireless communication. In some aspects, a user equipment (UE) may determining that a first physical downlink control channel (PDCCH) candidate and a second PDCCH candidate in a control resource set (CORESET) are aligned with each other, wherein the first PDCCH candidate is a common search space (CSS) candidate and the second PDCCH candidate is a UE-specific search space (UESS) candidate; and decode downlink control information in accordance with a selected candidate, of the CSS candidate or the UESS candidate, based at least in part on a rule indicating whether the time-domain resource allocation is to be determined in accordance with the CSS candidate or the UESS candidate. Numerous other aspects are provided.

28 Claims, 5 Drawing Sheets

Related U.S. Application Data filed on Oct. 5, 2018, provisional application No. 62/744,098, filed on Oct. 10, 2018.

(51) Int. Cl.
*H04W 72/02* (2009.01)
*H04W 88/02* (2009.01)

(58) Field of Classification Search
USPC .................................. 370/329, 330
See application file for complete search history.

(56) References Cited

U.S. PATENT DOCUMENTS

| | | | | |
|---|---|---|---|---|
| 2015/0117336 | A1* | 4/2015 | Huss | H04W 72/042 |
| | | | | 370/329 |
| 2015/0351119 | A1* | 12/2015 | Song | H04W 72/1268 |
| | | | | 370/329 |
| 2016/0088597 | A1* | 3/2016 | Saito | H04L 5/0094 |
| | | | | 370/329 |
| 2017/0215179 | A1* | 7/2017 | Choi | H04L 1/0025 |
| 2018/0324770 | A1* | 11/2018 | Nogami | H04L 5/005 |
| 2019/0140776 | A1* | 5/2019 | Seo | H04B 7/0695 |
| 2019/0174327 | A1* | 6/2019 | You | H04W 4/70 |
| 2019/0313378 | A1* | 10/2019 | Abdoli | H04W 72/042 |
| 2020/0092855 | A1* | 3/2020 | Seo | H04W 72/042 |
| 2020/0178116 | A1* | 6/2020 | Liu | H04W 28/04 |
| 2020/0220703 | A1* | 7/2020 | Kim | H04L 5/10 |
| 2020/0351851 | A1* | 11/2020 | Aiba | H04W 72/042 |

OTHER PUBLICATIONS

Huawei., et al., "Analysis of solutions for Handling DCI Format Ambiguity between CSS and UESS at Cross-Carrier Scheduling," 3GPP Draft; R1-103434, Analysis of Solutions for Handling DCI Format Ambiguity between CSS and UESS at Cross-Carrier Scheduling, 3rd Generation Partnership Project (3GPP), Mobile Competence Centre, 650, Route Des Lucioles ; F-06921 Sophia-Antipolis C, vol. RAN WG1, No. Dresden. Germany, Jun. 28, 2010-Jul. 2, 2010, Jun. 22, 2010 (Jun 22, 2010), 4 pages, XP050648389, [retrieved on Jun. 22, 2010], p. 1, line 8-p. 4.

International Search Report and Written Opinion—PCT/US2019/053002—ISA/EPO—dated Dec. 10, 2019.

"3rd Generation Partnership Project, Technical Specification Group Radio Access Network, Evolved Universal Terrestrial Radio Access (E-UTRA), Physical layer procedures (Release 11 )", 3GPP Standard, 3GPP TS 36.213, 3rd Generation Partnership Project (3GPP), Mobile Competence Centre, 650, Route Des Lucioles, F-06921 Sophiaanti Polis Cedex, France, vol. RAN WG1, No. V11.1.0, Dec. 20, 2012 (Dec. 20, 2012), pp. 1-160, XP050691223, [retrieved on Dec. 20, 2012].

* cited by examiner

RESOLVING TIME-DOMAIN RESOURCE ALLOCATION AMBIGUITY

CROSS-REFERENCE TO RELATED APPLICATION

This application claims priority to Provisional Patent Application Nos. 62/738,864, 62/741,893, and 62/744,098, which were filed on Sep. 28, 2018, Oct. 5, 2018, and Oct. 10, 2018, respectively, and which are all entitled "RESOLVING TIME-DOMAIN RESOURCE ALLOCATION AMBIGUITY." The above-named Provisional Patent Applications are hereby expressly incorporated by reference herein.

FIELD OF THE DISCLOSURE

Aspects of the present disclosure generally relate to wireless communication, and more particularly to techniques and apparatuses for resolving time-domain resource allocation ambiguity.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include determining that a first physical downlink control channel (PDCCH) candidate and a second PDCCH candidate in a control resource set (CORESET) are aligned with each other, wherein the first PDCCH candidate is a common search space (CSS) candidate and the second PDCCH candidate is a UE-specific search space (UESS) candidate; and decoding downlink control information in accordance with a selected candidate, of the CSS candidate or the UESS candidate, based at least in part on a rule indicating whether the downlink control information is to be decoded in accordance with the CSS candidate or the UESS candidate.

In some aspects, a UE for wireless communication may include memory and one or more processors operatively coupled to the memory. The memory and the one or more processors may be configured to determine that a first physical downlink control channel (PDCCH) candidate and a second PDCCH candidate in a control resource set (CORESET) are aligned with each other, wherein the first PDCCH candidate is a common search space (CSS) candidate and the second PDCCH candidate is a UE-specific search space (UESS) candidate; and decode downlink control information in accordance with a selected candidate, of the CSS candidate or the UESS candidate, based at least in part on a rule indicating whether the downlink control information is to be decoded in accordance with the CSS candidate or the UESS candidate.

In some aspects, a non-transitory computer-readable medium may store one or more instructions for wireless communication. The one or more instructions, when executed by one or more processors of a UE, may cause the one or more processors to determine that a first physical downlink control channel (PDCCH) candidate and a second PDCCH candidate in a control resource set (CORESET) are aligned with each other, wherein the first PDCCH candidate is a common search space (CSS) candidate and the second PDCCH candidate is a UE-specific search space (UESS) candidate; and decode downlink control information in accordance with a selected candidate, of the CSS candidate or the UESS candidate, based at least in part on a rule indicating whether the downlink control information is to be decoded in accordance with the CSS candidate or the UESS candidate.

In some aspects, an apparatus for wireless communication may include means for determining that a first physical downlink control channel (PDCCH) candidate and a second PDCCH candidate in a control resource set (CORESET) are aligned with each other, wherein the first PDCCH candidate is a common search space (CSS) candidate and the second PDCCH candidate is a UE-specific search space (UESS) candidate; and means for decoding downlink control information in accordance with a selected candidate, of the CSS candidate or the UESS candidate, based at least in part on a rule indicating whether the downlink control information is to be decoded in accordance with the CSS candidate or the UESS candidate.

In some aspects, a method of wireless communication, performed by a user equipment (UE), may include determining that information indicating a time-domain resource allocation is received in a control resource set (CORESET) that includes a common search space (CSS) candidate and a UE-specific search space (UESS) candidate that are aligned with each other; identifying the time-domain resource allocation in accordance with a selected candidate, of the CSS candidate or the UESS candidate, based at least in part on a rule indicating whether the time-domain resource allocation is to be determined in accordance with the CSS candidate or the UESS candidate; and receiving or transmitting information based at least in part on the time-domain resource allocation.

In some aspects, a UE for wireless communication may include memory and one or more processors operatively coupled to the memory. The memory and the one or more processors may be configured to determine that information indicating a time-domain resource allocation is received in a control resource set (CORESET) that includes a common search space (CSS) candidate and a UE-specific search space (UESS) candidate that are aligned with each other; identify the time-domain resource allocation in accordance with a selected candidate, of the CSS candidate or the UESS candidate, based at least in part on a rule indicating whether the time-domain resource allocation is to be determined in accordance with the CSS candidate or the UESS candidate; and receive or transmit information based at least in part on the time-domain resource allocation.

In some aspects, a non-transitory computer-readable medium may store one or more instructions for wireless communication. The one or more instructions, when executed by one or more processors of a UE, may cause the one or more processors to determine that information indicating a time-domain resource allocation is received in a control resource set (CORESET) that includes a common search space (CSS) candidate and a UE-specific search space (UESS) candidate that are aligned with each other; identify the time-domain resource allocation in accordance with a selected candidate, of the CSS candidate or the UESS candidate, based at least in part on a rule indicating whether the time-domain resource allocation is to be determined in accordance with the CSS candidate or the UESS candidate; and receive or transmit information based at least in part on the time-domain resource allocation.

In some aspects, an apparatus for wireless communication may include means for determining that information indicating a time-domain resource allocation is received in a control resource set (CORESET) that includes a common search space (CSS) candidate and a UE-specific search space (UESS) candidate that are aligned with each other; means for identifying the time-domain resource allocation in accordance with a selected candidate, of the CSS candidate or the UESS candidate, based at least in part on a rule indicating whether the time-domain resource allocation is to be determined in accordance with the CSS candidate or the UESS candidate; and means for receiving or transmitting information based at least in part on the time-domain resource allocation.

In some aspects, a method of wireless communication, performed by a user equipment (UE), may include receiving information that identifies a configuration for a UE-specific search space (UESS) and a common search space (CSS) of a control resource set (CORESET), wherein the configuration is associated with at least one physical downlink control channel (PDCCH) candidate that, when decoded, is indistinguishable as associated with the UESS or the CSS; and determining that the information that identifies the configuration is associated with an error.

In some aspects, a UE for wireless communication may include memory and one or more processors operatively coupled to the memory. The memory and the one or more processors may be configured to receive information that identifies a configuration for a UE-specific search space (UESS) and a common search space (CSS) of a control resource set (CORESET), wherein the configuration is associated with at least one physical downlink control channel (PDCCH) candidate that, when decoded, is indistinguishable as associated with the UESS or the CSS; and determine that the information that identifies the configuration is associated with an error.

In some aspects, a non-transitory computer-readable medium may store one or more instructions for wireless communication. The one or more instructions, when executed by one or more processors of a UE, may cause the one or more processors to receive information that identifies a configuration for a UE-specific search space (UESS) and a common search space (CSS) of a control resource set (CORESET), wherein the configuration is associated with at least one physical downlink control channel (PDCCH) candidate that, when decoded, is indistinguishable as associated with the UESS or the CSS; and determine that the information that identifies the configuration is associated with an error.

In some aspects, an apparatus for wireless communication may include means for receiving information that identifies a configuration for a UE-specific search space (UESS) and a common search space (CSS) of a control resource set (CORESET), wherein the configuration is associated with at least one physical downlink control channel (PDCCH) candidate that, when decoded, is indistinguishable as associated with the UESS or the CSS; and means for determining that the information that identifies the configuration is associated with an error.

Aspects generally include a method, apparatus, system, computer program product, non-transitory computer-readable medium, user equipment, base station, wireless communication device, and processing system as substantially described herein with reference to and as illustrated by the accompanying drawings, specification, and appendix.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
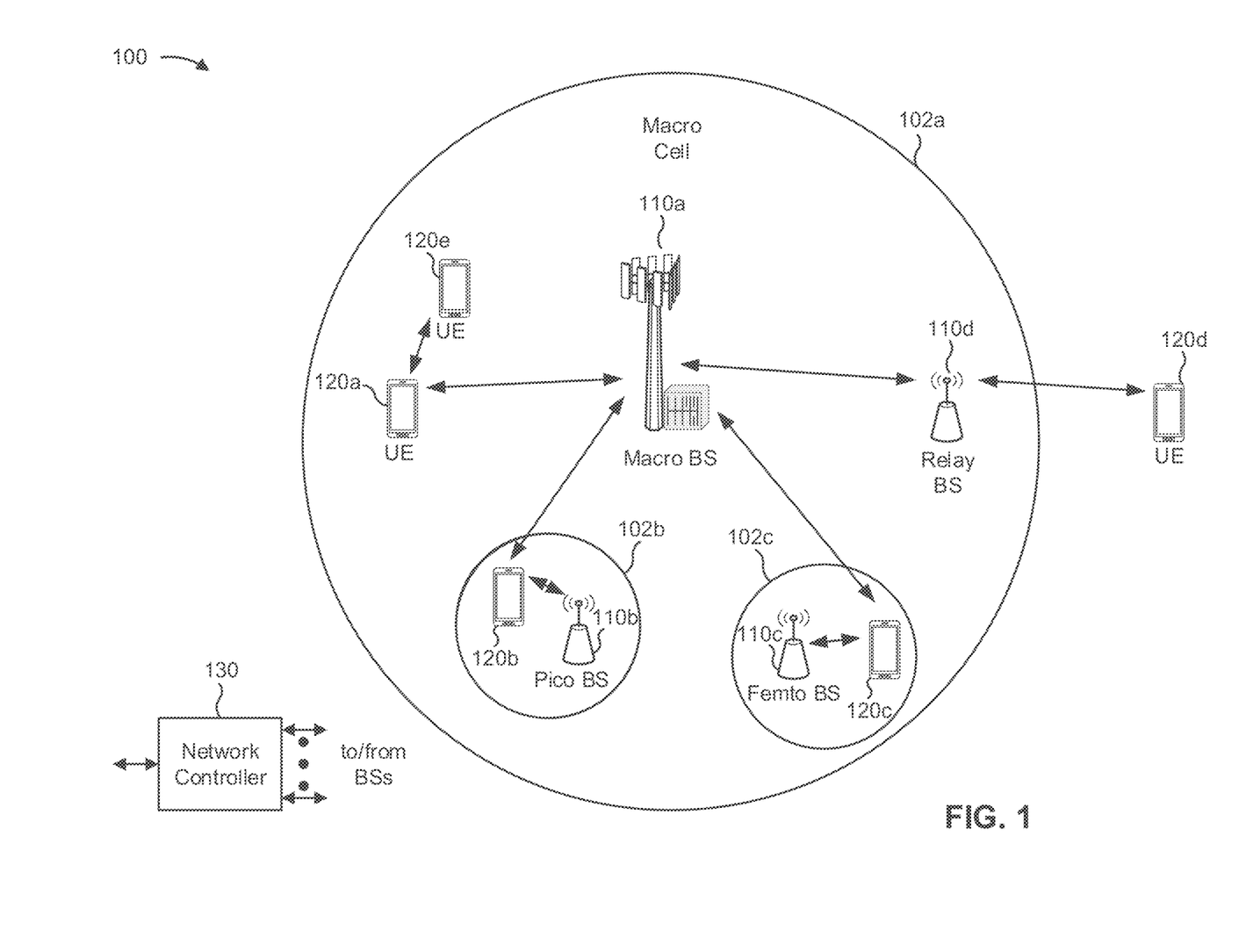
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, a biometric sensor or device, a wearable device (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
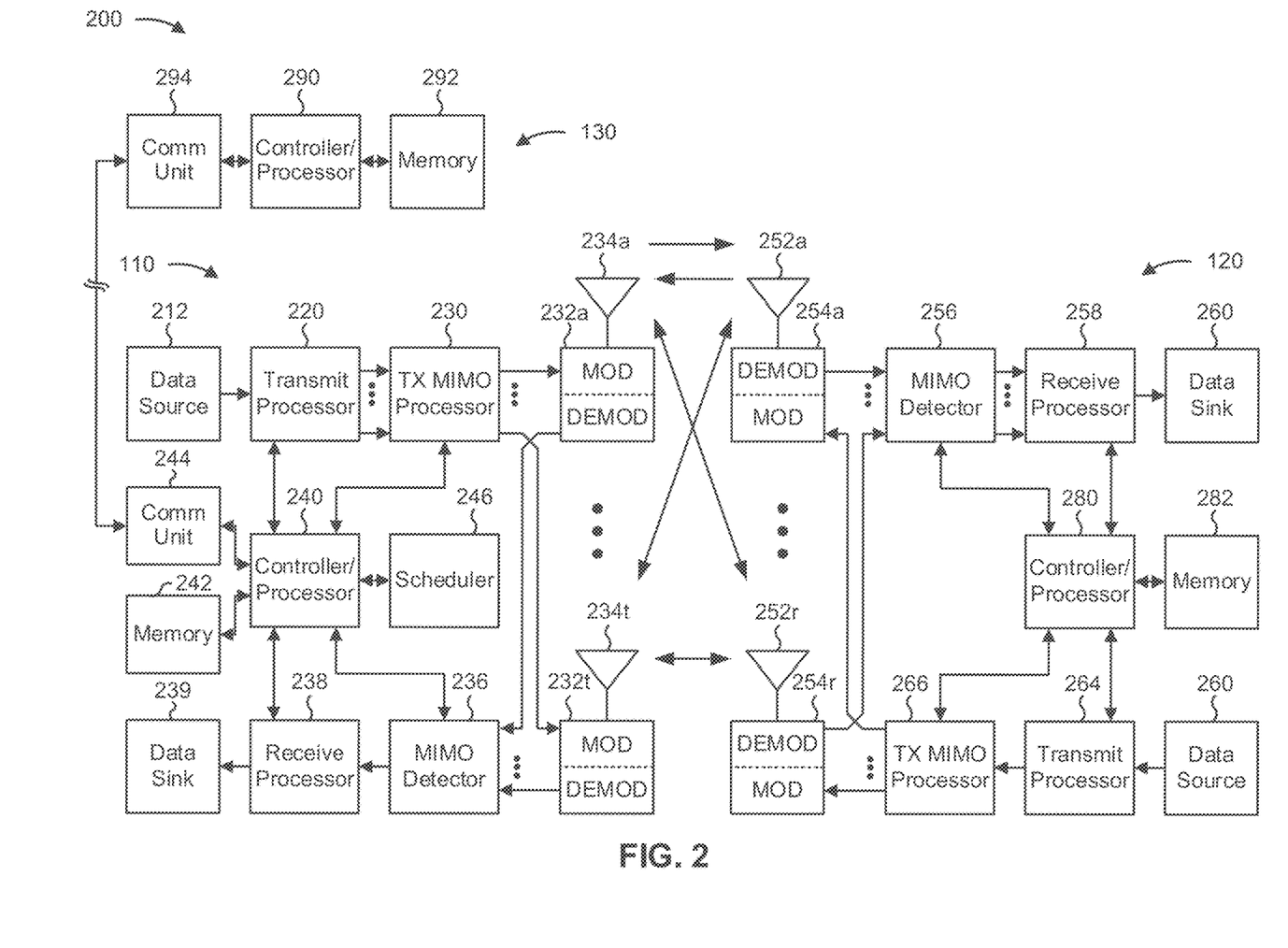
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general $T \geq 1$ and $R \geq 1$.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with resolving ambiguity in time-domain resource allocations, as described in more detail elsewhere herein. For example, controller/processor 240 of base station 110, controller/processor 280 of UE 120, and/or any other component(s) of FIG. 2 may perform or direct operations of, for example, process 400 of FIG. 4 and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for determining that information indicating a time-domain resource allocation is received in a control resource set (CORESET) that includes a common search space (CSS) candidate and a UE-specific search space (UESS) candidate that are aligned with each other; means for identifying the time-domain resource allocation in accordance with a selected candidate, of the CSS candidate or the UESS candidate, based at least in part on a rule indicating whether the time-domain resource allocation is to be determined in accordance with the CSS candidate or the UESS candidate; means for receiving or transmitting information based at least in part on the time-domain resource allocation; means for determining the time-domain resource allocation using a time-domain resource allocation table associated with the selected candidate; means for dropping a candidate, of the UESS candidate and the CSS candidate, other than the selected candidate; means for decoding the information indicating a time-domain resource allocation based at least in part on an assumption that the selected candidate, and not the candidate other than the selected candidate, is transmitted by a base station; means for determining a second time-domain resource allocation for another candidate, of the UESS candidate and the CSS candidate, other than the selected candidate; means for performing a first decoding attempt based at least in part on the first time-domain resource allocation and a second decoding attempt based at least in part on the second time-domain resource allocation; means for transmitting a single uplink data channel based at least in part on the first time-domain resource allocation and the second time-domain resource allocation being aligned; means for transmitting a first uplink data channel based at least in part on the first time-domain resource allocation and a second uplink data channel based at least in part on the second time-domain resource allocation; means for transmitting an uplink data channel in accordance with one of the first time-domain resource allocation or the second time-domain resource allocation based at least in part on the first time-domain resource allocation and the second time-domain resource allocation being partially aligned; means for determining an error based at least in part on the first time-domain resource allocation and the second time-domain resource allocation being partially aligned; means for receiving information that identifies a configuration for a UE-specific search space (UESS) and a common search space (CSS) of a control resource set (CORESET), wherein the configuration is associated with at least one physical downlink control channel (PDCCH) candidate that, when decoded, is indistinguishable as associated with the UESS or the CSS; means for determining that the information that identifies the configuration is associated with an error; means for determining that a same time-domain resource allocation table is associated with the CSS candidate and the UESS candidate; means for determining that a first time-domain resource allocation table is associated with the CSS candidate and a second time-domain resource allocation table is associated with the UESS candidate, wherein the first time-domain resource allocation table is different than the second time-domain resource allocation table; means for determining a first time-domain resource allocation using the first time-domain resource allocation table and a second time-domain resource allocation using the second time-domain resource allocation table, wherein the time-domain resource allocation is based at least in part on at least one of the first time-domain resource allocation or the second time-domain resource allocation; means for determining that a first physical downlink control channel (PDCCH) candidate and a second PDCCH candidate in a control resource set (CORESET) are aligned with each other, wherein the first PDCCH candidate is a common search space (CSS) candidate and the second PDCCH candidate is a UE-specific search space (UESS) candidate; means for decoding downlink control information in accordance with a selected candidate, of the CSS candidate or the UESS candidate, based at least in part on a rule indicating whether the downlink control information is to be decoded in accordance with the CSS candidate or the UESS candidate; means for receiving or transmitting information based at least in part on the time-domain resource allocation; and/or the like. In some aspects, such means may include one or more components of UE 120 described in connection with FIG. 2.

As indicated above, FIG. 2 is provided as an example. Other examples may differ from what is described with regard to FIG. 2.

A time-domain resource allocation (TDRA) for a data channel (e.g., a downlink data channel such as a physical downlink shared channel (PDSCH), an uplink data channel such as a physical uplink shared channel (PUSCH), and/or the like) may be indicated in a grant, such as a downlink grant or an uplink grant. For example, the grant may be received in downlink control information (DCI). The time-domain resource allocation may include an index associated with a table, wherein each entry of the table indicates a set of symbols (e.g., OFDM symbols) to be used for the data channel, a K0 value (e.g., a delay between the grant and the corresponding data channel), a mapping type, and/or the like. In some cases, the grant may be associated with other information or other information may be determined based at least in part on the grant. The grant may be associated with a configured table (e.g., when the configured table has been configured in a higher layer) or a default table (e.g., when no configured table is configured). It should be noted that the techniques and apparatuses described herein are applicable for DCI carrying any type of information and are not limited to those involving TDRAs.

The DCI may be in one or more control channel elements (CCEs) of a control resource set (CORESET). A UE may not know the exact location of the DCI before the DCI is received. A CORESET may include various search spaces. A UE may search the search spaces, based at least in part on physical downlink control channel (PDCCH) candidates (e.g., search hypotheses), to identify a DCI relevant to the UE. For example, the DCI relevant to the UE may be scrambled using a radio network temporary identifier (RNTI) (e.g., a cell RNTI (C-RNTI), a modulation and coding scheme C-RNTI (MCS-C-RNTI), a configured scheduling RNTI (CS-RNTI), and/or the like) that is known to or associated with the UE. The UE may search one or more common search spaces (CSSs) that may be searched by multiple UEs of a cell, and may search one or more UE-specific search spaces (UESSs) that may be specific to the UE. For example, the UE may search a CSS using CSS candidates (e.g., PDCCH candidates in the CSS) and may search a UESS using UESS candidates (e.g., PDCCH candidates in the UESS). A CSS may at least partially overlap a UESS.

A grant received in a CSS may be associated with a different time-domain resource allocation table than a grant received in a UESS for the purpose of determining the time-domain resource allocation. This may cause some ambiguity as to which table should be used to determine the time-domain resource allocation when a grant is received in overlapping search spaces. For example, assume a PDSCH or PUSCH is scheduled using C-RNTI, MCS-C-RNTI, or CS-RNTI. In that case, for PDSCH, a higher-layer configured table in pdsch-TimeDomainAllocationList in either pdsch-ConfigCommon or pdsch-Config is applied if these are configured. Otherwise, a default table is used. Similarly, for the PUSCH, the higher layer configured table in pusch-AllocationList in either pusch-ConfigCommon or pusch-Config is applied if these are configured. Otherwise, a default table is used. In CORESET #0, if pdsch-TimeDomainAllocationList is provided in pdsch-Config, a table associated with PDSCH time domain resource assignment indicated by a DCI in CSS is different than the table associated with PDSCH time-domain resource assignment indicated by a DCI in UESS. The determination of time-domain RA table for PUSCH follows similar rules.

Thus, in certain conditions, a UE may be capable of successfully decoding DCI, but the decoded DCI may not be distinguishable as associated with the CSS or the UESS. Thus, there may be two or more possible interpretations of the time-domain resource assignment or other aspects of the decoded DCI, leading to uncertainty.

Some techniques and apparatuses described herein resolve the ambiguity for DCI received in an ambiguous CSS and UESS. For example, some techniques and apparatuses described herein may determine whether to decode the DCI in accordance with a CSS candidate or a UESS candidate based at least in part on a rule. Particular examples of the rule are described in more detail in connection with FIG. 3, below. In some cases, the UE may resolve the ambiguity, as described in more detail elsewhere herein. In some cases, the base station may resolve the ambiguity using the rule described herein. In this way, the UE and/or the base station may more reliably decode a DCI in the case of overlapping search spaces, thereby improving network reliability and increasing the number of usable candidates.

Figure 3:
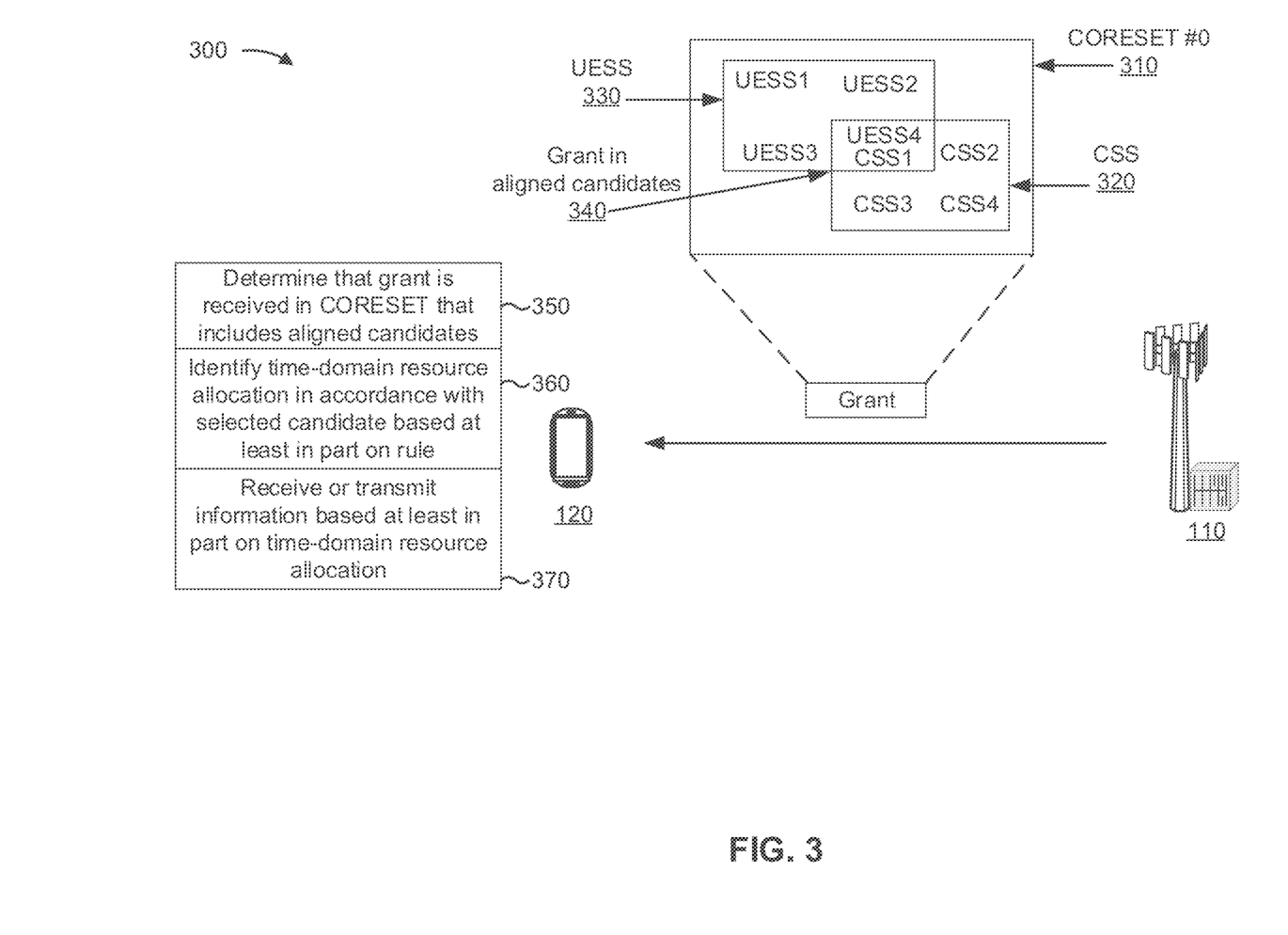
FIG. 3 is a diagram illustrating an example of resolving ambiguity for a time-domain resource allocation, in accordance with various aspects of the present disclosure.

FIG. 3 is a diagram illustrating an example 300 of resolving ambiguity for a time-domain resource allocation, in accordance with various aspects of the present disclosure.

As shown in FIG. 3, a BS 110 may provide a grant to a UE 120. In some aspects, the BS 110 may provide DCI to the UE 120, and references to grants herein should be understood to refer to any form of DCI. As shown by reference number 310, the grant may be provided in a CORESET #0. As used herein, CORESET #0 may refer to a CORESET that is configured by a physical broadcast channel (PBCH) or via remaining minimum system information (RMSI). In some aspects, the grant may be provided in one or more CCEs of the CORESET #0. As shown, the CORESET #0 includes a CSS 320 and a UESS 330. Candidates of the CSS 320 and the UESS 330 are shown as CSS1 through CSS4 and UESS1 through UESS4, respectively.

As shown by reference number 340, the grant may be received in one or more UESS candidates that are aligned with one or more CSS candidates. For example, the one or more UESS candidates and the one or more CSS candidates may at least partially overlap in one or more CCEs of the CORESET #0. Here, a UESS candidate UESS4 is aligned with a CSS candidate CSS1.

In some cases, if a DCI is received in the one or more CCEs of UESS4 and CSS1, the UE 120 may not be able to distinguish whether the DCI is associated with the CSS or with the UESS. For example, when the following conditions are met, the UE 120 may not be able to distinguish whether the DCI is associated with the CSS or the UESS:

- both the CSS and UESS are configured to be monitored by the UE 120 in CORESET #0;
- two PDCCH candidates are associated with the same set of CCEs;
- two candidates correspond to the same PDCCH scrambling identifier (e.g., two candidates have identical scrambling);
- two candidates have the same DCI size and/or DCI format (such as when fallback DCI with the same size are to be monitored in the CSS and UESS); and
- two candidates correspond to same RNTI type (e.g., C-RNTI, MCS-C-RNTI, CS-RNTI, etc.).

As shown by reference number 350, the UE 120 may determine that the grant is received in a CORESET that includes aligned candidates. For example, the UE 120 may determine that the conditions described above are met with regard to the grant. In some aspects, the UE 120 may identify or determine that the CORESET includes aligned candidates. For example, the UE 120 may determine that the CORESET is associated with aligned candidates before the grant is received. In some aspects, the UE 120 may determine that the UE 120 cannot distinguish whether the grant is associated with the UESS or the CSS. For example, the UE 120 may determine that the above set of conditions are met with regard to the CORESET.

As shown by reference number 360, the UE 120 may determine a time-domain resource allocation in accordance with a selected candidate, of the UESS candidate and the CSS candidate. More generally, the UE 120 may decode the DCI in accordance with the selected candidate. The UE 120 may determine the time-domain resource allocation based at least in part on a rule, as described in more detail below. In some aspects, the rule may indicate an action to perform with regard to the selected candidate and/or the other candidate, of the UESS candidate and the CSS candidate. For example, the action may include selecting a table corresponding to the selected candidate for determining the resource allocation. As another example, the action may include dropping the other candidate (e.g., the UE 120 may determine or assume that a grant, received in the one or more CCEs associated with the overlapping CSS candidate and UESS candidate, is associated with the selected candidate). Thus, the UE 120 may resolve the ambiguity between the UESS candidate and the CSS candidate.

In some aspects, the rule may indicate to use the CSS candidate to decode the downlink control information. For example, the rule may indicate to always use the CSS candidate when the UESS is configured in the CORESET #0. As another example, the rule may indicate to use the CSS candidate if the conditions described above are satisfied (e.g., if the UESS candidate and the CSS candidate are not distinguishable). In some aspects, the rule may indicate that, on a per-slot basis, if there is at least one candidate in the UESS that is not distinguishable from a CSS candidate, then all candidates in the UESS are to be interpreted in accordance with the CSS candidate. In some aspects, the rule may indicate that if an ambiguity occurs in any slot (e.g., one or more slots), then the UE 120 is to use the CSS candidate as the selected candidate for all slots (e.g., more than one slot). In some aspects, the rule may indicate that the grant is to be interpreted in accordance with the CSS candidate if a UESS with fallback DCI is configured in CORESET 0. This rule may be applied for all candidates in the UESS that includes the overlap, for all candidates in all UESSs of the CORESET, or for all candidates in the UESS that is associated with the fallback DCI (e.g., in the case when both fallback and non-fallback DCI is configured).

In some aspects, the rule may indicate to use the UESS candidate to determine the time-domain resource allocation table for a CSS candidate. For example, the rule may indicate to use the UESS candidate when the UESS is configured in the CORESET #0. As another example, the rule may indicate to use the UESS candidate if the conditions described above are satisfied (e.g., if the CSS candidate and the UESS candidate are not distinguishable). In some aspects, the rule may indicate that, on a per-slot basis, if there is at least one candidate in the CSS that is not distinguishable from a UESS candidate, then all candidates in the CSS are to be interpreted in accordance with the UESS candidate. In some aspects, the rule may indicate that if an ambiguity occurs in any slot (e.g., one or more slots), then the UE 120 is to use the UESS candidate as the selected candidate for all slots (e.g., more than one slot). In some aspects, the rule may indicate that the grant is to be interpreted in accordance with the UESS candidate if a UESS with fallback DCI is configured in CORESET 0. This rule may be applied for all candidates in the CSS that includes the overlap, for all candidates in all CSSs of the CORESET.

In some aspects, the UE 120 may drop the UESS candidate or the CSS candidate (e.g., the other candidate other than the selected candidate). For example, the UE 120 may drop the UESS candidate when the set of conditions described above is satisfied (e.g., when the UE 120 cannot distinguish a UESS grant from a CSS grant), and decode the CSS candidate only. As another example, the UE 120 may drop the CSS candidate when the set of conditions described above is satisfied (e.g., when the UE 120 cannot distinguish a UESS grant from a CSS grant), and may decode the UESS candidate only.

In some aspects, the UE 120 may apply the rule as long as the UESS and the CSS are configured with the same PDCCH scrambling identifier. In this case, the UE 120 may not need to check whether the other conditions described herein for ambiguity/collision are satisfied. For example, the PDCCH scrambling identifier may be a parameter that is radio resource control (RRC) configured for a search space. Each PDCCH candidate may be scrambled by the scrambling ID associated with its corresponding search space. Thus, the UE 120 may know the time-domain RA after the UE 120 receives the RRC configuration, without checking with individual candidate. This simplifies the UE implementation.

In some aspects, the rule may be based at least in part on an index of a candidate. For example, the rule may be based at least in part on an index of the UESS candidate or the CSS candidate. In some aspects, when a particular candidate (e.g., a candidate associated with the alignment or at least partial overlap) is associated with an index that satisfies a threshold (e.g., an index of a first N candidates), then the UE 120 may determine the resource allocation in accordance with the particular candidate (e.g., may follow a rule associated with the particular candidate to determine the table, may drop the other candidate, etc.). When the index does not satisfy the threshold (e.g., an index after the first N candidates), then the UE 120 may determine the resource allocation in accordance with the other candidate (e.g., may follow a rule associated with the other candidate to determine the table, may drop the particular candidate, etc.).

In some aspects, the rule may be based at least in part on a search space identifier of a candidate. For example, the UESS and the CSS may be associated with different search space identifiers. The UE 120 may prioritize one search space over the other based at least in part on the search space identifier. For example, the UE 120 may drop a candidate with a lower search space identifier, may drop a candidate with a higher search space identifier, or may perform a different action based at least in part on the search space identifier.

In some aspects, when a particular candidate (e.g., a candidate associated with the collision) is associated with an index that satisfies a threshold (e.g., an index of a first N candidates), then the UE 120 may determine the resource allocation in accordance with another candidate (e.g., may follow a rule associated with the other candidate to determine the table, may drop the particular candidate, etc.). When the index does not satisfy the threshold (e.g., an index after the first N candidates), then the UE 120 may determine the resource allocation in accordance with the particular candidate (e.g., may follow a rule associated with the particular candidate to determine the table, may drop the other candidate, etc.).

In some aspects, the rule may be based at least in part on a time-domain pattern. For example, the time-domain pattern may be applied at the symbol granularity, the slot granularity, and/or the like. The time-domain pattern may be configured (e.g., using radio resource control messaging, and/or the like), or may be specified or preconfigured. As an example, the UE 120 may determine that a first candidate is to be used if the CORESET is in an odd-numbered slot, or that a second candidate is to be used if the CORESET is in an even-numbered slot. As another example, the UE 120 may determine that a first candidate is to be used if an SS occasion of the candidate has an odd starting symbol index (e.g., OFDM symbol index), or may determine that a second candidate is to be used if an SS occasion of the candidate has an even starting symbol index. In some aspects, the rule may be based at least in part on a pattern for a candidate. For example, when a particular candidate is associated with an even index, the UE 120 may use the particular candidate as the selected candidate, or when the particular candidate is associated with an odd index, the UE 120 may use another candidate as the selected candidate.

In some aspects, the rule may be different for a downlink grant than for an uplink grant. For example, the UE 120 may use a first rule, of the rules described above, for a grant associated with a downlink data channel, and may use a second rule, of the rules described above, for a grant associated with an uplink data channel.

In some aspects, the UE may determine the resource allocation based at least in part on whether time-domain resource allocation tables of the CSS and the UESS are the same. For example, if the CSS and the UESS are associated with the same time-domain resource allocation table, then the UE 120 may use the time-domain resource allocation table and the determined (e.g., indistinguishable) PDCCH candidate to determine the time-domain resource allocation table. If the time-domain resource allocation tables of the UESS and the CSS are different, then the UE 120 may apply another rule described herein to resolve the ambiguity. For example, the UE 120 may drop one of the CSS candidate or the UESS candidate based at least in part on the other rule.

In some aspects, when the UE 120 determines that the PDCCH candidate is indistinguishable, and when the time-domain resource allocation tables associated with the UESS and the CSS are different, the UE 120 may determine time-domain resource allocations using the respective time-domain resource allocation tables and based at least in part on a time-domain resource allocation index identified by the decoded PDCCH candidate. If the time-domain resource allocations for the UESS and the CSS are the same, then the UE 120 may use the common time-domain resource allocation. If the time-domain resource allocations are different, then the UE 120 may apply another rule described herein to determine which time-domain resource allocation is to be used.

In some aspects, the UE 120 may determine whether the two time-domain resource allocation tables are the same based at least in part on whether all contents and elements of the two tables match each other. In some aspects, the UE 120 may determine whether the two time-domain resource allocation tables are the same as follows: a first table and a second table may be determined to be different, as long as the first table and the second table are configured separately (e.g., in separate RRC configuration information elements). Namely, if the first table is configured in pdsch-config (or pusch-config), and the second table is configured in pdsch-configcommon (or pusch-configcommon), then the first table and the second table are determined by the UE 120 to be different, regardless of whether the actual contents of the two tables are identical or not.

As shown by reference number 370, the UE 120 may receive or transmit a communication based at least in part on the time-domain resource allocation. For example, the UE 120 may receive or transmit a data channel in a resource allocation that determined in accordance with the rule described above.

In some aspects, the UE 120 may handle the ambiguity of the candidate. For example, assume that the grant is a downlink grant associated with a first resource allocation for a UESS candidate and a second resource allocation for a CSS candidate. In that case, the UE 120 may determine the first resource allocation and the second resource allocation, and may attempt to decode a corresponding data transmission using the first resource allocation and the second resource allocation. In other words, the UE 120 may perform a decoding attempt for each candidate associated with the collision.

As another example, assume that a grant is an uplink grant associated with a first resource allocation for a UESS candidate and a second resource allocation for a CSS candidate. In some aspects, when the first resource allocation and the second resource allocation are completely aligned or overlapped, the UE 120 may transmit a corresponding data channel on the aligned resource. When the first resource allocation and the second resource allocation are completely non-aligned or non-overlapped, the UE 120 may transmit two data channels (e.g., one using the first resource allocation and one using the second resource allocation). When the first resource allocation and the second resource allocation are partially aligned or overlapped, the UE 120 may treat this as an error case and may transmit nothing, or the UE 120 may select one of the resource allocations and may transmit in the selected resource allocation. Thus, the UE 120 may conserve processor resources of the BS 110 that may be used to determine which candidate should be used for the grant.

In some aspects, the UE 120 and/or the BS 110 may treat the case of an indistinguishable PDCCH in an overlapping UESS and CSS as an error case. For example, the UE 120 may not expect the UESS and the CSS to be configured in a fashion that can include or lead to an indistinguishable PDCCH. In such a case, the UE 120 may receive information (e.g., radio resource control information and/or the like) that identifies a configuration for the UESS and the CSS, wherein the configuration is associated with at least one candidate that, when decoded, is indistinguishable as associated with the UESS or the CSS. The UE 120 may determine that the information is associated with an error. In some aspects, the UE 120 may drop the information, may determine that the information was unsuccessfully decoded, may return an error to the BS 110, may perform a combination of the above, and/or the like. The BS 110 may be configured not to configure a search space that leads to ambiguity with regard to whether a candidate is associated with the UESS or the CSS. In some aspects, if a UE 120 decodes a PDCCH candidate in CORESET #0, the UE does not expect that the candidate is indistinguishable as associated with a UESS or a CSS. In some aspects, a UE does not expect to be configured with a PDCCH candidate in CORESET #0 that, when decoded, is indistinguishable as associated with a UESS or a CSS.

The above operations are primarily described from the perspective of the UE 120. However, similar operations may be performed by the BS 110 when transmitting the grant. For example, the BS 110 may determine that a CORESET is associated with aligned candidates that may be indistinguishable to a UE 120, may select a desired candidate, of the UESS candidate and the CSS candidate, and may generate the grant based at least in part on the rule so that the grant is interpreted by the UE 120 in accordance with the desired candidate. In this way, the BS 110 may reduce ambiguity of overlapping search spaces.

In some cases herein, the UE 120 is described as selecting a table for determining the resource allocation. An example ruleset for selecting the table for the downlink based at least in part on whether the candidate is a CSS candidate or a UESS candidate is provided below:

| RNTI | PDCCH search space | SS/PBCH block and CORESET multiplexing pattern | pdsch-ConfigCommon includes pdsch-TimeDomainAllocationList | PDSCH time domain resource allocation to apply | pdsch-Config includes pdsch-TimeDomainAllocationList |
|---|---|---|---|---|---|
| C-RNTI, MCS-C-RNTI, | Any common search space associated with | 1, 2, 3 1, 2, 3 | No Yes | Default A pdsch-TimeDomainAllocationList | — — |

| RNTI | PDCCH search space | SS/PBCH block and CORESET multiplexing pattern | pdsch-ConfigCommon includes pdsch-TimeDomainAllocationList | PDSCH time domain resource allocation to apply | pdsch-Config includes pdsch-TimeDomainAllocationList |
|---|---|---|---|---|---|
| CS-RNTI | CORESET# 0 | | | provided in pdschConfigCommon | |
| C-RNTI, MCS-C-RNTI, CS-RNTI | Any common search space not associated with CORESET# 0 | 1, 2, 3 | No | Default A | No |
| | | 1, 2, 3 | Yes | pdsch-TimeDomainAllocationList provided in pdsch-ConfigCommon | No |
| | UE specific search space | 1, 2, 3 | No/Yes | pdsch-TimeDomainAllocationList provided in pdsch-Config | Yes |

A similar example ruleset for the uplink is provided below:

| RNTI | PDCCH search space | pusch-ConfigCommon includes pusch-AllocationList | pusch-Config includes pusch-AllocationList | PUSCH time domain resource allocation to apply |
|---|---|---|---|---|
| C-RNTI, MCS-C-RNTI, TC-RNTI | Any common search space associated with CORESET 0 | No Yes | — | Default A pusch-AllocationList provided in pusch-ConfigCommon |
| C-RNTI, MCS-C-RNTI, CS-RNTI | Any common search space not associated with CORESET 0, UE specific search space | No Yes | No No | Default A pusch-AllocationList provided in pusch-ConfigCommon |
| | search space | No/Yes | Yes | pusch-AllocationList provided in pusch-Config |

An example of a table used to determine a resource allocation is provided in Table 5.1.2.1.1-2 of 3GPP Technical Specification 38.214. After the UE 120 determines that a dropping/collision resolution rule is needed, the UE 120 may always use a particular table (e.g., any of the three RA tables described above, namely "Default A", "pdsch-TimeDomainAllocationList provided in pdsch-ConfigCommon", and "pdsch-TimeDomainAllocationList provided in pdsch-Config").

As indicated above, FIG. 3 is provided as an example. Other examples may differ from what is described with respect to FIG. 3.

Figure 4:
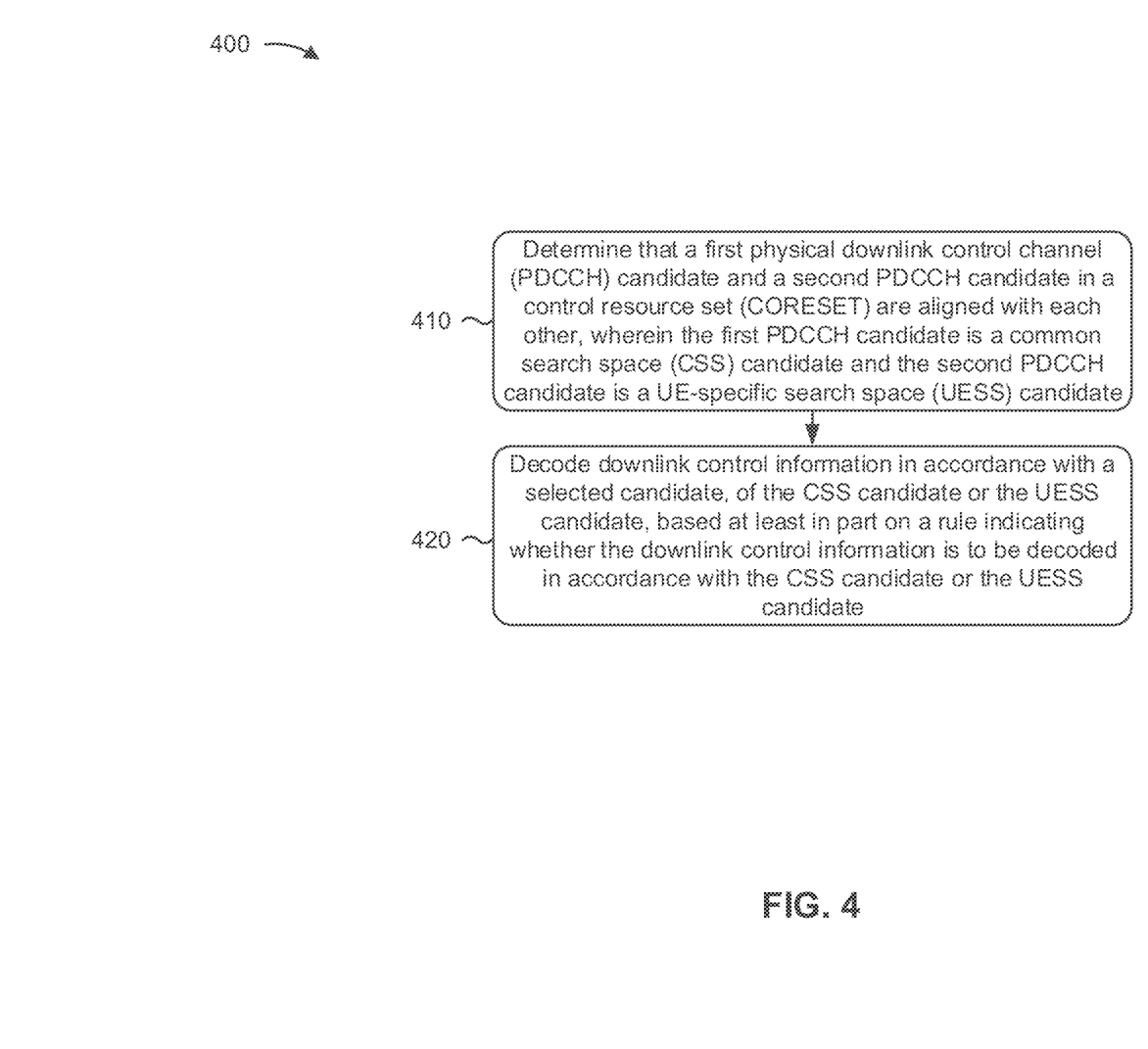
FIG. 4 is a diagram illustrating an example process performed, for example, by a user equipment, in accordance with various aspects of the present disclosure.

FIG. 4 is a diagram illustrating an example process 400 performed, for example, by a UE, in accordance with various aspects of the present disclosure. Example process 400 is an example where a UE (e.g., UE 120) performs resolution of ambiguity for a time-domain resource allocation, or more generally for DCI.

As shown in FIG. 4, in some aspects, process 400 may include determining that a first physical downlink control channel (PDCCH) candidate and a second PDCCH candidate in a control resource set (CORESET) are aligned with each other, wherein the first PDCCH candidate is a common search space (CSS) candidate and the second PDCCH candidate is a UE-specific search space (UESS) candidate (block 410). For example, the UE (e.g., using controller/processor 280 and/or the like) may determine that a first PDCCH candidate and a second PDCCH candidate in a CORESET are aligned with each other, wherein the first PDCCH candidate is a CSS candidate and the second PDCCH candidate is a UESS candidate.

As shown in FIG. 4, in some aspects, process 400 may include decoding downlink control information in accordance with a selected candidate, of the CSS candidate or the UESS candidate, based at least in part on a rule indicating whether the downlink control information is to be decoded in accordance with the CSS candidate or the UESS candidate (block 420). For example, the UE (e.g., using controller/processor 280 and/or the like) may decode downlink control information in accordance with a selected candidate, of the CSS candidate or the UESS candidate. The UE may decode the downlink control information based at least in part on a rule indicating whether the downlink control information is to be decoded in accordance with the CSS candidate or the UESS candidate.

Process 400 may include additional aspects, such as any single aspect or any combination of aspects described below and/or in connection with one or more other processes described elsewhere herein.

In some aspects, the information identifying the time-domain resource allocation, when decoded, is not distinguishable as associated with the CSS candidate or the UESS candidate. In some aspects, the CORESET is a first CORESET configured via a broadcast channel or via remaining minimum system information transmission. In some aspects, the CORESET is a CORESET #0. In some aspects, a CSS of the CSS candidate and a UESS of the UESS are configured in the CORESET #0. In some aspects, the CSS candidate and the UESS candidate are associated with a same set of control channel elements. In some aspects, the CSS candidate and the UESS candidate are associated with a same scrambling identifier.

In some aspects, the CSS candidate and the UESS candidate have a same downlink control information size or same downlink control information format. In some aspects, the CSS candidate and the UESS candidate correspond to a fallback downlink control information. In some aspects, the CSS candidate and the UESS candidate are associated with a same radio network temporary identifier type. In some aspects, identifying the time-domain resource allocation in accordance with the selected candidate further comprises determining the time-domain resource allocation using a time-domain resource allocation table associated with the selected candidate.

In some aspects, the rule indicates that the time-domain resource allocation is to be determined in accordance with the selected candidate when a candidate, of the UESS candidate and the CSS candidate other than the selected candidate, is configured in the CORESET. In some aspects, the rule indicates that the time-domain resource allocation is to be determined in accordance with the selected candidate when the information identifying the time-domain resource allocation, when decoded, is not distinguishable as associated with the CSS candidate or the UESS candidate.

In some aspects, the rule indicates that if there is at least one candidate in a first search space, of a CSS and a UESS, that is not distinguishable from a candidate in a second search space, of the CSS and the UESS, then the time-domain resource allocation is to be determined in accordance with the selected candidate, wherein the selected candidate is associated with the first search space. In some aspects, the rule is applied for a slot in which the at least one candidate is not distinguishable. In some aspects, the rule is applied for more than one slot when the at least one candidate is not distinguishable in one or more slots.

In some aspects, the rule indicates that the time-domain resource allocation is to be determined in accordance with the selected candidate when a UESS associated with the UESS candidate is associated with fallback downlink control information. In some aspects, the rule applies for all candidates of the corresponding search space in the control resource set. In some aspects, the rule applies for all candidates of the control resource set. In some aspects, another candidate of the corresponding search space is not associated with fallback downlink control information, and the rule applies for the candidate that is associated with the fallback downlink control information and not the other candidate.

In some aspects, identifying the time-domain resource allocation in accordance with the selected candidate further comprises dropping a candidate, of the UESS candidate and the CSS candidate, other than the selected candidate. In some aspects, dropping the candidate further comprises decoding the information indicating a time-domain resource allocation based at least in part on an assumption that the selected candidate, and not the candidate other than the selected candidate, is transmitted by a base station.

In some aspects, the rule indicates that the time-domain resource allocation is to be determined in accordance with the selected candidate when an index of a particular candidate, of the UESS and the CSS, satisfies a threshold, and the rule indicates that the time-domain resource allocation is to be determined in accordance with another candidate, of the UESS candidate and the CSS candidate other than the selected candidate, when the index of the particular candidate does not satisfy the threshold. In some aspects, the particular candidate is the selected candidate. In some aspects, the particular candidate is not the selected candidate.

In some aspects, the rule is based at least in part on a time-domain pattern associated with a slot or candidate index. In some aspects, the information identifying the time-domain resource allocation is contained in an uplink grant. In some aspects, the information identifying the time-domain resource allocation is contained in a downlink grant. In some aspects, the rule is different for an uplink time-domain resource allocation than for a downlink time-domain resource allocation.

In some aspects, the time-domain resource allocation determined in accordance with the selected candidate is a first time-domain resource allocation. The UE may determine a second time-domain resource allocation for another candidate, of the UESS candidate and the CSS candidate, other than the selected candidate. In some aspects, receiving information based at least in part on the first time-domain resource allocation further comprises performing a first decoding attempt based at least in part on the first time-domain resource allocation and a second decoding attempt based at least in part on the second time-domain resource allocation. In some aspects, transmitting information based at least in part on the first time-domain resource allocation further comprises transmitting a single uplink data channel based at least in part on the first time-domain resource allocation and the second time-domain resource allocation being aligned. In some aspects, receiving or transmitting information based at least in part on the first time-domain resource allocation further comprises transmitting a first uplink data channel based at least in part on the first time-domain resource allocation and a second uplink data channel based at least in part on the second time-domain resource allocation.

In some aspects, receiving or transmitting information based at least in part on the first time-domain resource allocation further comprises transmitting an uplink data channel in accordance with one of the first time-domain resource allocation or the second time-domain resource allocation based at least in part on the first time-domain resource allocation and the second time-domain resource allocation being partially aligned. In some aspects, the UE may determine an error based at least in part on the first time-domain resource allocation and the second time-domain resource allocation being partially aligned.

In some aspects, the UE may determine that a same time-domain resource allocation table is associated with the CSS candidate and the UESS candidate; and identify the time-domain resource allocation using the same time-domain resource allocation table.

In some aspects, the UE may determine that a first time-domain resource allocation table is associated with the CSS candidate and a second time-domain resource allocation table is associated with the UESS candidate, wherein the first time-domain resource allocation table is different than the second time-domain resource allocation table; and determine a first time-domain resource allocation using the first time-domain resource allocation table and a second time-domain resource allocation using the second time-domain resource allocation table, wherein the time-domain resource allocation is based at least in part on at least one of the first time-domain resource allocation or the second time-domain resource allocation. In some aspects, the first time-domain resource allocation and the second time-domain resource allocation are equivalent to the time-domain resource allocation. In some aspects, the rule is based at least in part on respective search space identifiers of the CSS candidate and the UESS candidate.

In a first aspect, the downlink control information, when decoded, is not distinguishable as associated with the CSS candidate or the UESS candidate. In a second aspect, alone or in combination with the first aspect, the CORESET is a first CORESET configured via a broadcast channel or via remaining minimum system information transmission. In a third aspect, alone or in combination with the first aspect and/or the second aspect, the CORESET is a CORESET #0. In a fourth aspect, alone or in combination with any one or more of the first through third aspects, a CSS of the CSS candidate and a UESS of the UESS are configured in the CORESET #0.

In a fifth aspect, alone or in combination with any one or more of the first through fourth aspects, the CSS candidate and the UESS candidate are associated with a same set of control channel elements.

In a sixth aspect, alone or in combination with any one or more of the first through fifth aspects, the CSS candidate and the UESS candidate are associated with a same scrambling identifier. In a seventh aspect, alone or in combination with any one or more of the first through sixth aspects, the CSS candidate and the UESS candidate have a same downlink control information size and a same downlink control information format. For example, the same downlink control information format may be a fallback downlink control information format. In an eighth aspect, alone or in combination with any one or more of the first through seventh aspects, the CSS candidate and the UESS candidate are associated with a same radio network temporary identifier type. For example, the RNTI type is associated with at least one of a cell RNTI, a configured scheduling RNTI, or a modulation and coding scheme cell RNTI.

In a ninth aspect, alone or in combination with any one or more of the first through eighth aspects, the rule indicates that the downlink control information is to be decoded in accordance with the selected candidate when the downlink control information, when decoded, is not distinguishable as associated with the CSS candidate or the UESS candidate.

In a tenth aspect, alone or in combination with any one or more of the first through ninth aspects, the rule indicates that if there is at least one candidate in a first search space, of a CSS and a UESS, that is not distinguishable from a candidate in a second search space, of the CSS and the UESS, then the downlink control information is to be decoded in accordance with the selected candidate, wherein the selected candidate is associated with the first search space.

In an eleventh aspect, alone or in combination with any one or more of the first through tenth aspects, the rule is applied for a slot in which the at least one candidate is not distinguishable.

In a twelfth aspect, alone or in combination with any one or more of the first through eleventh aspects, the rule is applied for more than one slot when the at least one candidate is not distinguishable in one or more slots.

In a thirteenth aspect, alone or in combination with any one or more of the first through twelfth aspects, decoding the downlink control information in accordance with the selected candidate further comprises dropping a candidate, of the UESS candidate and the CSS candidate, other than the selected candidate.

In a fourteenth aspect, alone or in combination with any one or more of the first through thirteenth aspects, dropping the candidate further comprises decoding the decoding the downlink control information of the selected candidate and not the candidate other than the selected candidate.

In a fifteenth aspect, alone or in combination with any one or more of the first through fourteenth aspects, the selected candidate is the CSS candidate.

In a sixteenth aspect, alone or in combination with any one or more of the first through fifteenth aspects, the downlink control information includes information indicating a time-domain resource allocation.

In a seventeenth aspect, alone or in combination with any one or more of the first through sixteenth aspects, decoding the downlink control information further comprises identifying the time-domain resource allocation in accordance with the selected candidate. The UE may receive or transmit information based at least in part on the time-domain resource allocation.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
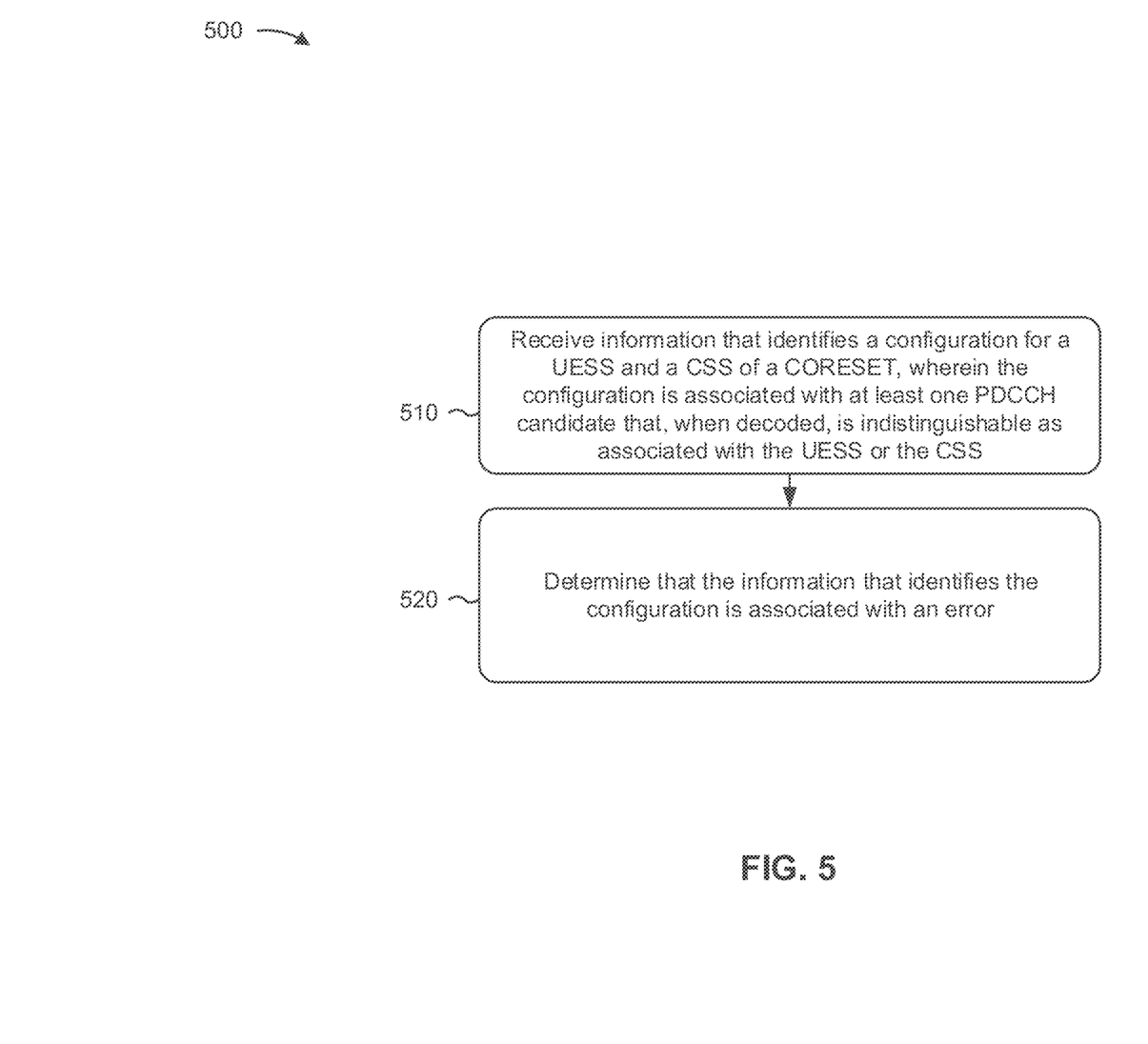
FIG. 5 is a diagram illustrating an example process performed, for example, by a user equipment, in accordance with various aspects of the present disclosure.

FIG. 5 is a diagram illustrating an example process 500 performed, for example, by a UE, in accordance with various aspects of the present disclosure. Example process 500 is an example where a UE (e.g., UE 120) performs resolution of ambiguity for a time-domain resource allocation.

As shown in FIG. 5, in some aspects, process 500 may include receiving information that identifies a configuration for a UE-specific search space (UESS) and a common search space (CSS) of a control resource set (CORESET), wherein the configuration is associated with at least one physical downlink control channel (PDCCH) candidate that, when decoded, is indistinguishable as associated with the UESS or the CSS (block 510). For example, the UE (e.g., using antenna 252, DEMOD 254, MIMO detector 256, receive processor 258, controller/processor 280, and/or the like) may receive information that identifies a configuration for a UESS and a CSS of a CORESET, wherein the configuration is associated with at least one PDCCH candidate that, when decoded, is indistinguishable as associated with the CSS or the UESS.

As shown in FIG. 5, in some aspects, process 500 may include determining that the information that identifies the configuration is associated with an error (block 520). For example, the UE (e.g., using controller/processor 280 and/or the like) may determine that the information that identifies the configuration is associated with an error. In some aspects, the information that identifies the configuration may include RRC information and/or the like.

Process 500 may include additional aspects, such as any single aspect or any combination of aspects described below and/or in connection with one or more other processes described elsewhere herein.

In some aspects, the CORESET is a first CORESET configured via a broadcast channel or via remaining minimum system information transmission. In some aspects, the CORESET is a CORESET #0. In some aspects, the CSS and the UESS are configured in the CORESET #0. In some aspects, the PDCCH candidate is associated with a same set of control channel elements for the CSS and the UESS.

In some aspects, the PDCCH candidate is associated with a same scrambling identifier in the CSS and the UESS. In some aspects, the PDCCH candidate has a same downlink control information size or same downlink control information format for the CSS and the UESS. In some aspects, the PDCCH candidate corresponds to a fallback downlink control information for the CSS and the UESS. In some aspects, the PDCCH candidate is associated with a same radio network temporary identifier type for the CSS and the UESS.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be openended terms. Further, the phrase "based on" is intended to mean "based, at least in part, on" unless explicitly stated otherwise.

What is claimed is:

1. A method of wireless communication performed by a user equipment (UE), comprising:
   determining that a first physical downlink control channel (PDCCH) candidate and a second PDCCH candidate in a control resource set (CORESET) are aligned with each other, wherein the first PDCCH candidate is a common search space (CSS) candidate and the second PDCCH candidate is a UE-specific search space (UESS) candidate; and
   decoding downlink control information in accordance with a rule indicating whether the downlink control information is to be decoded in accordance with the CSS candidate or the UESS candidate,
   wherein the rule indicates that the downlink control information is to be decoded in accordance with the CSS candidate when the downlink control information, when decoded, is not distinguishable as associated with the CSS candidate or the UESS candidate.

2. The method of claim 1, wherein the CORESET is a CORESET #0.

3. The method of claim 1, wherein the CSS candidate and the UESS candidate are associated with a same set of control channel elements.

4. The method of claim 3, wherein a CSS of the CSS candidate and a UESS of the UESS candidate are configured in the CORESET #0.

5. The method of claim 1, wherein the CSS candidate and the UESS candidate are associated with a same scrambling identifier.

6. The method of claim 1, wherein the CSS candidate and the UESS candidate have a same downlink control information size and a same downlink control information format.

7. The method of claim 6, wherein the same downlink control information format is a fallback downlink control information format.

8. The method of claim 1, wherein the CSS candidate and the UESS candidate are associated with a same radio network temporary identifier (RNTI) type.

9. The method of claim 8, wherein the RNTI type is associated with at least one of a cell RNTI, a configured scheduling RNTI, or a modulation and coding scheme cell RNTI.

10. The method of claim 1, wherein the rule indicates that if there is at least one candidate in a first search space, of a CSS and a UESS, that is not distinguishable from a candidate in a second search space, of the CSS and the UESS, then the downlink control information is to be decoded in accordance with the selected candidate, wherein the selected candidate is associated with the first search space.

11. The method of claim 1, wherein decoding the downlink control information in accordance with the selected candidate further comprises:
    dropping a candidate, of the UESS candidate and the CSS candidate, other than the selected candidate.

12. The method of claim 11, wherein dropping the candidate further comprises:
    decoding the downlink control information of the selected candidate and not the candidate other than the selected candidate.

13. The method of claim 1, wherein the selected candidate is the CSS candidate.

14. The method of claim 1, wherein the downlink control information includes information indicating a time-domain resource allocation.

15. The method of claim 14, wherein decoding the downlink control information further comprises identifying the time-domain resource allocation in accordance with the selected candidate; and
wherein the method further comprises:
receiving or transmitting information based at least in part on the time-domain resource allocation.

16. A user equipment (UE) for wireless communication, comprising:
a memory; and
one or more processors coupled to the memory, the memory and the one or more processors configured to:
determine that downlink control information is associated with a control resource set (CORESET) that includes a common search space (CSS) candidate and a UE-specific search space (UESS) candidate that are aligned with each other; and
decode downlink control information at least in part in accordance with a rule indicating whether the downlink control information is to be decoded in accordance with the CSS candidate or the UESS candidate,
wherein the rule indicates that the downlink control information is to be decoded in accordance with the CSS candidate when the downlink control information, when decoded, is not distinguishable as associated with the CSS candidate or the UESS candidate.

17. The UE of claim 16, wherein a CSS of the CSS candidate and a UESS of the UESS are configured in the CORESET #0.

18. The UE of claim 17, wherein the CORESET is a CORESET #0.

19. The UE of claim 17, wherein the CSS candidate and the UESS candidate are associated with a same set of control channel elements.

20. The UE of claim 17, wherein the CSS candidate and the UESS candidate are associated with a same scrambling identifier.

21. The UE of claim 17, wherein the CSS candidate and the UESS candidate are associated with a same radio network temporary identifier (RNTI) type.

22. The UE of claim 21, wherein the RNTI type is associated with at least one of a cell RNTI, a configured scheduling RNTI, or a modulation and coding scheme cell RNTI.

23. The UE of claim 16, wherein the CSS candidate and the UESS candidate have a same downlink control information size and a same downlink control information format.

24. The UE of claim 23, wherein the same downlink control information format is a fallback downlink control information format.

25. An apparatus for wireless communication, comprising:
means for determining that a first physical downlink control channel (PDCCH) candidate and a second PDCCH candidate in a control resource set (CORESET) are aligned with each other, wherein the first PDCCH candidate is a common search space (CSS) candidate and the second PDCCH candidate is a UE-specific search space (UESS) candidate; and
means for decoding downlink control information at least in part in accordance with a rule indicating whether the downlink control information is to be decoded in accordance with the CSS candidate or the UESS candidate,
wherein the rule indicates that the downlink control information is to be decoded in accordance with the CSS candidate when the downlink control information, when decoded, is not distinguishable as associated with the CSS candidate or the UESS candidate.

26. The apparatus of claim 25, wherein the CORESET is a CORESET #0.

27. The apparatus of claim 26, wherein a CSS of the CSS candidate and a UESS of the UESS candidate are configured in the CORESET #0.

28. A non-transitory computer-readable medium storing one or more instructions for wireless communication, the one or more instructions comprising:
one or more instructions that, when executed by one or more processors of a user equipment (UE), cause the one or more processors to:
determine that a first physical downlink control channel (PDCCH) candidate and a second PDCCH candidate in a control resource set (CORESET) are aligned with each other, wherein the first PDCCH candidate is a common search space (CSS) candidate and the second PDCCH candidate is a UE-specific search space (UESS) candidate; and
decode downlink control information at least in part in accordance with a rule indicating whether the downlink control information is to be decoded in accordance with the CSS candidate or the UESS candidate,
wherein the rule indicates that the downlink control information is to be decoded in accordance with the CSS selected candidate when the downlink control information, when decoded, is not distinguishable as associated with the CSS candidate or the UESS candidate.

* * * * *